Figure 1:
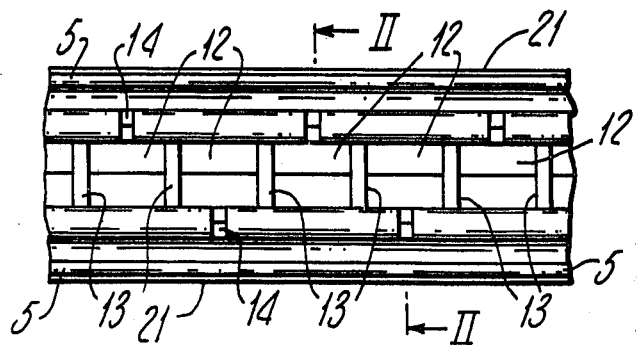

United States Patent [19]
Pointer

[11] 4,436,128
[45] Mar. 13, 1984

[54] TIRES FOR WHEELS

[76] Inventor: Simon P. Pointer, 31 Eaton St., Norwich, NR4 7LD, England

[21] Appl. No.: 402,971

[22] Filed: Jul. 29, 1982

[30] Foreign Application Priority Data

Jul. 30, 1981 [GB] United Kingdom ............... 8123406

[51] Int. Cl.³ ..................... B60C 15/00; B60C 11/00; B60C 13/00
[52] U.S. Cl. ............................... 152/209 R; 152/325; 152/380
[58] Field of Search ............. 152/380, 329, 328, 327, 152/323–325, 246, 209 R, 209 D

[56] References Cited

U.S. PATENT DOCUMENTS 4,345,633 8/1982 Gilmore ........................... 152/328

Primary Examiner—William A. Powell
Assistant Examiner—Thomas Bokan
Attorney, Agent, or Firm—Merchant, Gould, Smith, Edell, Welter & Schmidt

[57] ABSTRACT

A tubeless tire for a bicycle wheel has lips (5) integral with the side walls to form with the beads (3) recesses to house the wheel rim flanges (9). The tire interior is divided into equal sized compartments (12) by partitions (13). Each compartment has a vent (14) on one side only extending through a respective bead centrally between partitions, the vents of adjacent compartments being in opposite beads.

5 Claims, 2 Drawing Figures

TIRES FOR WHEELS

This invention relates to tires for wheels for bicycles, tricycles and other light vehicles.

In accordance with the invention a tubeless tire for a wheel comprises a tread portion and sidewall portions terminating in bead portions to rest in the well of a wheel rim to receive the tire, lips spaced outwardly from the sidewall portions and integral therewith to overlie respective outer surfaces of the wheel rim flanges and form, with the bead carrying portion, recesses to receive the peripheral edges of the rim flanges, a plurality of equispaced venting channels extending across each bead portion, the channels in each bead portion being in staggered relation to those in the other bead portion, and a plurality of equispaced partitions extending transversely between the side walls and radially inwardly from the inner surface of the tread portion to divide the tire interior into a series of empty cells each of which extends between the side walls.

Preferably the channels in each side wall are spaced successively centrally of alternate cells so that each cell is provided with a vent on one side only.

The tire is preferably an integral moulding of plastics material, e.g. polyurethane with ply reinforcements and beads of nylon cord.

Figure 2:
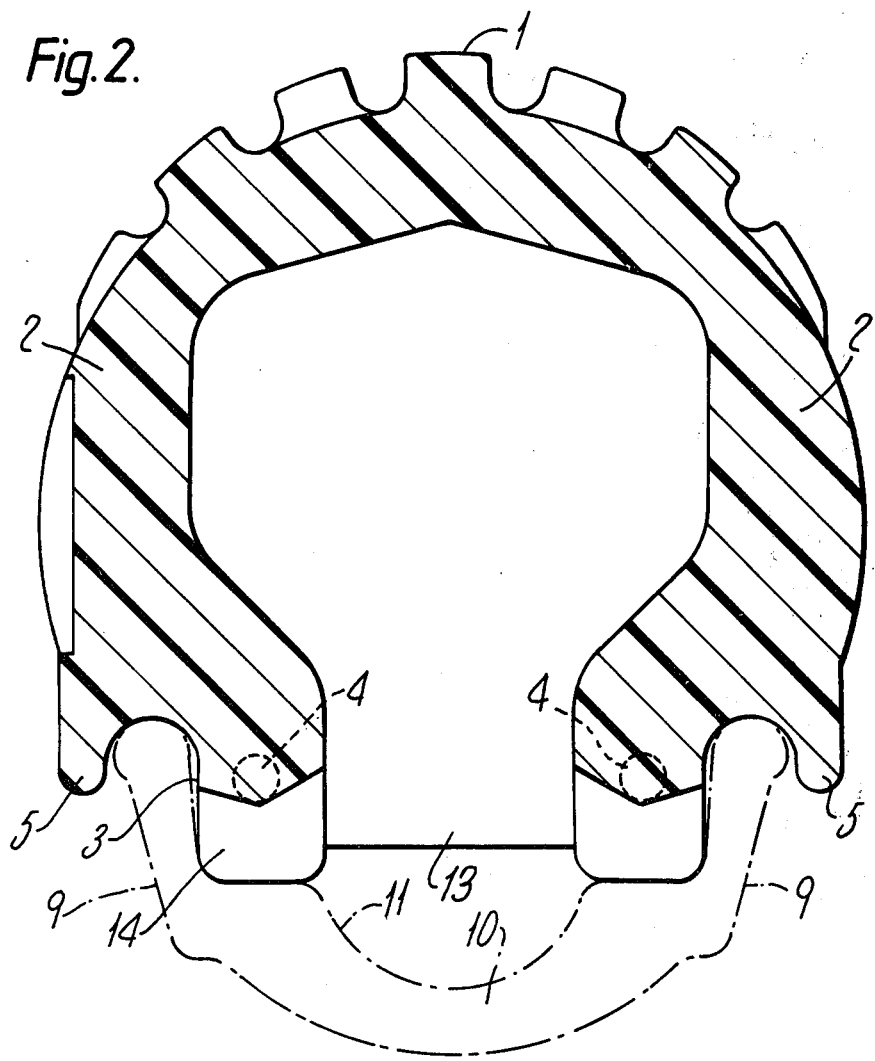

An embodiment of the invention will now be described with reference to the accompanying drawings, wherein:

FIG. 1 shows an elevation of part of a tire according to the invention as viewed from the tyre centre of rotation, and FIG. 2 shows an enlarged section of the tire on the line II—II in FIG. 1.

The tubeless bicycle tire shown in the drawings is a one-piece moulding of polyurethane comprising a tread portion 1 with side walls 2 having a profile substantially similar to the conventional tubed bicycle tire cover. The sidewalls terminate in bead portions 3 each of which contains a substantially inextensible bead 4 of nylon cord. Extending from the outer faces of the sidewalls are lips 5 which overlie the outer surfaces of the rim flanges 9 of a wheel rim 10 to which the tire is fitted, the bead portion 3 seating in the rim well 11.

As best shown in FIG. 1, the hollow interior of the tire is divided circumferentially into empty cells 12 by equispaced partitions 13 extending from the inner surface of the thread portion and between the sidewalls and lying in planes extending radially from the centre of rotation of the tyre.

Each cell 12 has a notch-like vent channel 14 extending through the bead portion on one side of the cell, the channel being disposed on the opposite sides of successive cells. Thus each bead portion has a plurality of channels in its edge which lie opposite the middle of alternate cells, and the channels in one bead portion are staggered in relation to the channels in the other bead portion by the circumferential length of a cell.

When the tire is in use each cell is compressed and allowed to re-expand as it goes through the lowest point of the tire path in contact with the road. At the same time the flexing of the tire causes the bead portion to be pressed outwardly and increase the grip between the tire and the rim. The partition buttresses the tread and prevents collapse of the tire under heavy loads.

By suitably matching the resilient characteristics of the tire material with the size of the cells and the size of the vents it is possible to achieve the desired degree of resilience to provide a comfortable ride with optimum road holding and rolling resistance characteristics. The tire is, of course, "puncture-proof" since in general an object piercing the tread or a wall will only enter one cell and since there is no high internal air pressure within any of the cells there is no danger of the tire collapsing as is the case with conventional tubed tires.

In a modified construction, the tire is moulded from polyurethane foam instead of solid polyurethane. The moulding has a skin around its outer surface which provides a solid surface for the sidewalls and tread. With this structure the widths of the partitions 13 are increased by 100% compared with the solid tire, the radial depth of the lips is reduced by 30%, and the width of the channels 14 is increased by 25 to 35%.

What is claimed is:

1. A tubeless tire for a wheel comprising a tread portion, and sidewall portions terminating in bead portions to rest in the well of a wheel rim to receive the tire, lips spaced outwardly from the bead portions and integral with the sidewall portions to overlie respective outer surfaces of the wheel rim flanges and form, with the bead portions, recesses to receive the peripheral edges of the rim flanges, a plurality of equispaced venting channels extending across each bead portion, the channels in one bead portion, and a plurality of equispaced partitions extending transversely between the side walls and radially inwardly from the inner surface of the tread portion to divide the tyre interior into a series of empty cells each of which extends between the side walls and are entirely devoid of solids within the sidewalls and tread portion.

2. A tubeless tire according to claim 1, wherein the channels in each side wall are spaced successively centrally of alternate cells in such a manner that each cell is provided with a vent on one side only.

3. A tubeless tire according to claim 1 or 2 which is integrally moulded of a plastic material.

4. A tubeless tire according to claim 3 wherein the plastic material is polyurethane.

5. A tubeless tire according to claim 1 wherein the tire has a generally arcuate cross-sectional outer peripheral upon which tread is located.

* * * * *